(12) United States Patent
Shen et al.

(10) Patent No.: US 7,312,326 B2
(45) Date of Patent: Dec. 25, 2007

(54) FLUORESCENT LABELED NUCLEOTIDE DERIVATIVES

(75) Inventors: Gene G.-Y. Shen, Diamond Bar, CA (US); Yuan Lin, Walnut, CA (US); Josephine M. Michael, Placentia, CA (US)

(73) Assignee: Beckman Coulter, Inc., Fullerton, CA (US)

( * ) Notice: Subject to any disclaimer, the term of this patent is extended or adjusted under 35 U.S.C. 154(b) by 379 days.

(21) Appl. No.: 10/821,500

(22) Filed: Apr. 9, 2004

(65) Prior Publication Data

US 2005/0227240 A1    Oct. 13, 2005

(51) Int. Cl.
C07H 19/04 (2006.01)
C12Q 1/68 (2006.01)
C12P 19/34 (2006.01)
C07F 9/02 (2006.01)
C07D 473/00 (2006.01)
C07F 9/06 (2006.01)
C07D 471/02 (2006.01)
G03G 15/00 (2006.01)

(52) U.S. Cl. .................. 536/26.6; 546/23; 546/24; 546/113; 430/56; 544/232; 544/277; 435/6; 435/91.1

(58) Field of Classification Search .......... 544/232, 544/277; 546/23, 24, 113; 536/26.6; 435/6, 435/91.1; 430/56
See application file for complete search history.

(56) References Cited

U.S. PATENT DOCUMENTS

| 5,453,505 A | 9/1995 | Lee et al. .................. 544/124 |
| 5,571,388 A | 11/1996 | Patonay et al. ............. 204/461 |
| 6,002,003 A | 12/1999 | Shen et al. .................. 544/232 |

FOREIGN PATENT DOCUMENTS

| WO | WO95/04747 | 2/1995 |
| WO | WO 01/85850 | 11/2001 |
| WO | WO 02/24815 | 3/2002 |

OTHER PUBLICATIONS

Flanagan, J.H., et al., *Bioconjugate Chem.*, 8:751-756 (1997).
CEQ™ 2000 Dye Terminator Cycle Sequencing, Beckman Coulter, Inc. (1999).

*Primary Examiner*—Jezia Riley
(74) *Attorney, Agent, or Firm*—Kristin C. Hiibner; Sheldon Mak Rose & Anderson (57) ABSTRACT

Fluorescent labeled reporter compounds having a modified cyanine dye that is coupled to a nucleotide derivative through a linker are disclosed. The compounds are useful for nucleic acid sequence analysis. The fluorescent labeled reporter compounds are ring-locked cyanine dyes that are coupled to a nucleotide derivative, such as a modified DNA base, through a linker. These fluorescent labeled reporter compounds can be used as DNA chain-terminators in DNA synthesis to generate DNA fragments that are fluorescently-labeled at the 3'-terminal end of the DNA fragment.

23 Claims, 4 Drawing Sheets

FLUORESCENT LABELED NUCLEOTIDE DERIVATIVES

BACKGROUND

The present invention relates to fluorescent labels that can be attached to nucleotide derivatives for use in nucleic acid sequencing. The nucleotide derivatives are nucleic acid chain terminating substrates that when attached to a fluorescent label afford fluorescently labeled chain terminators. These fluorescently labeled chain terminators can be incorporated into nucleic acid fragments, preferably the 3' terminal end, to identify the sequence of a nucleic acid. To be useful as a nucleic acid chain terminator substrate in fluorescence based nucleic acid sequencing, the chain terminator substrate must contain a fluorescent reporter and a nucleotide derivative that is capable of being added to a nucleic acid sequence, but is not capable of being used by a replication enzyme to attach a subsequent nucleotide or nucleotide derivative to the nucleic acid sequence.

Cyanine dyes used to detect biomolecules and in particular as a fluorescent reporter for labeling nucleic acid chain terminator substrates are known. However, these compounds can interfere with the binding or interaction of the nucleotide derivative with the replication enzyme, are unstable, difficult to synthetically manufacture, or have a fluorescent detection wavelength that is problematic for automated systems. Further information on fluorescent probes used to detect biomolecules can be found in Flanagan, J. H., et al., Bioconjugate Chem. 8:751-756 (1997); Mujumdar, R. B., et al., Bioconjugate Chem., 4:2 105-111 (1993); Mujumdar, R. B., et al., Cytometry, 10:11-19 (1989); Mujumdar, S. R., et al., Bioconjugate Chem., 7:356-362 (1996); Ozmen, B., et al., Tetrahedron Letters, 41:9185-9188 (2000); Shealy, D. B., et al., Anal. Chem. 67:247-251 (1995); Southwick, P. L., et al., Cytometry, 11418-430 (1990); Strekowski, L., et al., J. Org. Chem., 57:4578-4580 (1992); and Williams, R. J., et al., Anal. Chem., 65:601-605 (1993); and U.S. Pat. Nos. 5,453,505; 5,571,388; and 6,002,003.

Therefore, there is a need for a fluorescently labeled nucleic acid chain terminator that does not interfere with nucleotide replication, that is stable, and has a fluorescent detection wavelength that is amenable to automated systems.

SUMMARY

According to the present invention, fluorescent reporter compounds represented by the formula Z-L-Cy are provided. According to this embodiment, Z is a nucleotide; L is a linker of sufficient length to connect the nucleotide derivative to the cyanine dye, such that the cyanine dye does not significantly interfere with the overall binding and recognition of the nucleotide derivative by a nucleic acid replication enzyme, such as diradical moiety having a chain length of at least 8 atoms; and Cy is a cyanine dye of the formula:

wherein

A and B are each independently the atoms necessary to form a cyanine nucleus;

$R_1$ and $R_2$ are each independently $C_1$-$C_6$ alkyl;

$R_3$ is hydrogen, or $C_1$-$C_4$ alkyl;

$R_4$ and $R_5$ are each independently selected from the group consisting of H and $SO_3^-$; and n is an integer between and including 2-4.

In the above described fluorescent reporter compounds, it is preferable, but not required that $R_4$ and $R_5$ are both $SO_3^-$, and $R_1$ and $R_2$ are both $C_1$-$C_4$ alkyl. More preferably, $R_1$ and $R_2$ are identical.

Examples of fluorescent reporter compounds according to the present invention include compounds of the formula:

and

-continued

It is preferable, but not required that the fluorescent reporter compounds according to the present invention have a fluorescence maximum greater than 750 nm, as measured in an aqueous solution.

According to the present invention, cyanine dyes of the following formula are also provided.

wherein
- A and B are each independently the atoms necessary to form a cyanine nucleus;
- X is O, S, $NR_9$, or $CR_9R_{10}$;
- $R_1$ and $R_2$ are each independently $C_1$-$C_6$ alkyl;
- $R_3$ is hydrogen, or $C_1$-$C_4$ alkyl;
- $R_4$ and $R_5$ are each independently selected from the group consisting of H and $SO_3$, provided that at least one of $R_4$ and $R_5$ is $SO_3$;
- $R_9$ and $R_{10}$ are each independently H or $C_1$-$C_4$ alkyl;
- p is an integer between and including 2-8; and
- n is an integer between and including 2-4.

In the above described cyanine dyes, it is preferable, but not required, that $R_4$ and $R_5$ are both $SO_3$, and $R_1$ and $R_2$ are both $C_1$-$C_4$ alkyl. More preferably, $R_1$ and $R_2$ are identical. Examples of preferred, but not required, cyanine dyes include compounds of the following formulas:

According to the present invention, a method of nucleic acid sequence analysis is also provided. According to this embodiment, a fluorescent reporter labeled compound of the formula Z-L-Cy is reacted with a first nucleic acid sequence to produce a second nucleic acid sequence labeled with the fluorescent reporter labeled compound. Then, the cyanine dye on the second nucleic acid sequence is detected.

According to the present invention, a method for determining the base sequence of DNA is also provided. According to this embodiment, a mixture of fluorescent reporter labeled compounds of the formula Z-L-Cy, corresponding to each of the four DNA bases is provided. A DNA template with a replication enzyme, a mixture of DNA nucleotides, and the mixture of fluorescent reporter-labeled compounds are then reacted. Accordingly, DNA fragments having a fluorescent reporter-labeled compound covalently attached to the 3'-terminal residue of each DNA fragment are then produced. The fluorescent reporter-labeled DNA fragments are then separated and the reporter for each separated fluorescent reporter-labeled DNA fragment is detected. The detected reporter information is then analyzed and the DNA sequence is identified.

FIGURES

These and other features, aspects and advantages of the present invention Will become better understood from the following description, appended claims, and accompanying figures where:

DESCRIPTION

According to one embodiment of the present invention, fluorescent labeled reporter compounds comprising a modified cyanine dye that is coupled to a nucleotide derivative through a linker are provided. The compounds are used in nucleic acid sequence analysis. More specifically, a mixture of cyanine dye based fluorescent reporter compounds, corresponding to the four DNA base types, can be used as DNA chain-terminators in DNA synthesis to generate DNA fragments that are fluorescently-labeled at the 3'-terminal end. The fluorescently-labeled DNA fragments can then be analyzed to determine a DNA sequence.

The fluorescent labeled reporter compounds according to the present invention contain a modified cyanine dye that is modified by ring-locking the cyanine dye chromophore with a cycloalkenyl ring, as shown in Formula 1.

Formula 1

A Ring-locked Cyanine Dye (Cy)

The cyanine dyes according to the present invention are coupled to a nucleotide derivative through the ring-locked portion of the cyanine chromophore, as shown in Formula 1 above, through a linker. Ring-locking the cyanine dye chromophore and attaching the nucleotide derivative through the ring-locked portion of the cyanine dye provides fluorescent labeled reporter compounds with enhanced stability, solubility, and quantum yield. These compounds have absorbance and emission frequencies in the near infrared region, a large extinction coefficient, and solubility in aqueous solutions. In addition, the fluorescent labeled reporter compounds can be incorporated into a nucleic acid chain termination reaction in high yield.

As used in this disclosure, the terms listed below have the following meanings.

The term "cyanine nucleus" means the carbon, hydrogen, and hetero-atoms necessary to complete the conjugated system that makes up a fluorescent cyanine chromophore. Cyanine nuclei that can be used in the fluorescent labels according to the present invention are known to those skilled in the art. Examples of cyanine nuclei include substituted or unsubstituted thiazole, benzothiazole, napthothiazole, benzoxazole, napthoxazole, benzolselanazole, napthoselenazole, indole, and benzoindole rings.

The term "heterocyclic-base" means a purine or pyrimidine base capable of acting as a recognition element by a replication enzyme used in a nucleic acid synthesis.

The term "nucleotide derivative" means a compound having a heterocyclic-base, a sugar, and a phosphate functionality that is capable of being added to a nucleic acid sequence, but is not capable of being used by a replication enzyme to attach a subsequent nucleotide or nucleotide derivative to the nucleic acid sequence.

The term "nucleoside derivative" means a nucleotide derivative minus the phosphate functionality.

As used in this disclosure, the term "phosphate functionality" means a mono-, di-, or tri-phosphate, or a phosphate analog such as an alpha-thiotriphosphate, that when joined to a nucleoside derivative forms a nucleotide derivative that is capable of being used by a replication enzyme to attach the nucleotide derivative to a nucleic acid sequence.

As used in this disclosure, the term "sugar" means a 5- or 6-membered heterocycle that when incorporated into a nucleic acid sequence is not capable of being used by a replication enzyme to attach a subsequent nucleotide or nucleotide derivative to the nucleic acid sequence.

As used in this disclosure, the term "comprise" and variations of the term, such as "comprising" and "comprises," are not intended to exclude other additives, components, integers or steps.

In one embodiment, the present invention is a fluorescent labeled reporter compound having a modified cyanine dye attached to a nucleotide derivative. A preferred, but not required, ring-locked cyanine fluorescent labeled reporter compound according to the present invention is shown in Formula 2.

Formula 2

In the above Formula 2, "Z" represents a nucleotide derivative having a heterocyclic-base, a sugar, and a phosphate functional Also shown in Formula 2 is "L" which represents a linker of sufficient length to connect the nucleotide derivative to the cyanine dye such that the cyanine dye and linker do not significantly interfere with the overall binding or recognition of the nucleotide derivative by a nucleic acid replication enzyme. Such linker groups are known to those of skill in the art and can be selected for use in the compounds according to the present invention, as will be understood by those of skill in the art with reference to this disclosure. In a preferred, but not required embodiment, the linker ("L") is a diradical moiety having a chain length of at least 8 atoms.

Also shown in Formula 2 above is "Cy" which represents a cyanine dye of the formula:

wherein
A and B are each independently the atoms necessary to form a cyanine nucleus;
$R_1$ and $R_2$ are each independently $C_1$-$C_6$ alkyl;
$R_3$ is hydrogen, or $C_1$-$C_4$ alkyl;
$R_4$ and $R_5$ are each independently selected from the group consisting of H and $SO_3^-$; and
n is an integer between and including 2-4.

A more preferred, but not required, ring-locked cyanine fluorescent reporter compound according to the present invention is shown in Formula 3.

Formula 3 wherein:
X is O, S, N $R_9$, or $CR_9R_{10}$;
$R_9$ and $R_{10}$ are each independently H or $C_1$-$C_4$ alkyl;
Y is a diradical moiety having 3 to 20 atoms, at least three of which include an alkynyl group and one or more heteroatoms; and
A, B, Z, $R_1$-$R_5$, and n are represented as described above for Formula 2.

A most preferred, but not required, ring-locked cyanine fluorescent reporter compound according to the present invention is shown in Formula 4.

Formula 4

In the above formula, C and D represent ring structures with sufficient carbon atoms to make up a benzene or naphthalene ring; m is an integer between and including 1-6; and Z and $R_1$-$R_5$, and n are represented as described above for Formula 2.

In the above Formulas 2-4, in a preferred, but not required embodiment, $R_4$ and $R_5$ are both $SO_3^-$, and $R_1$ and $R_2$ are identical lower alkyl groups.

In the above Formulas 2-3, in a preferred, but not required embodiment, A and B are ring structures having sufficient carbon atoms to form an indole or benzoindole ring.

In a preferred, but not required embodiment, the linker "L" and cyanine dye "Cy", together, is a compound according to Formula 5.

Formula 5 wherein
A, B, X, $R_1$-$R_5$, and n are represented as described above for Formulas 2-3, and p is an integer between and including 2-8.

Nucleic acid derivatives used as chain terminators, represented as "Z" in the above Formulas 2-4, are known to those of skill in the art. These nucleic acid derivatives are generally comprised of a heterocyclic-base, a sugar, and a phosphate functionality.

The heterocyclic-base is the portion of the nucleotide derivative that functions as the recognition element in nucleotide synthesis. Generally, these are a purine or pyrimidine base that correspond to a natural nucleic acid. Examples of heterocyclic-bases including, deazaadenine, deazaguanine, deazahypoxanthine, and uracil are shown below.

cytosine          uracil deazaadenine     deazaguanine deazahypoxathine

Other heterocyclic-bases that can act as the recognition element in nucleic acids such as 8-aza-7-deazapurines and 3,7-dideazaadenine can also be used.

The "sugar" portion of the nucleotide derivative corresponds to the deoxyribofuranose structural portion in the natural enzyme substrate. The sugar portion of the nucleotide derivative used in the fluorescent labeled reporter compounds is generally a modified 5- or 6-membered heterocycle such as a furanose that is not capable of being used by a replication enzyme to attach a subsequent nucleotide or nucleotide derivative to the nucleic acid sequence.

The "phosphate functionality" part of the nucleic acid derivative used in the fluorescent labeled reporter compound according to the present invention, is a mono-, di-, or tri-phosphate, or a phosphate analog such as an alpha-thiotriposphate functionality, that when joined to a nucleoside derivative forms a nucleotide derivative that is capable of being used by a replication enzyme to attach the nucleotide derivative to a nucleic acid sequence.

In a preferred but not required embodiment, the nucleic acid derivative is one of the following:

As shown in Formulas 2-4 above, the nucleic acid derivative can be attached to the modified cyanine dye through a linker. In a preferred but not required embodiment, the linker is an alkynyl amino group where the nucleic acid derivative is linked to the modified cyanine dye through one end of the alkyne moiety.

Fluorescent reporter compounds according to the present invention can be synthesized as shown below in Scheme 1.

Scheme 1.
Synthesis of Fluorescent Reporter Compounds (A, B, X, Z, $R_1$–$R_5$, and n are represented as described above for Formulas 2–4).

As shown in Scheme 1, iminium salts (1A) and (1B), which represent the cyanine nuclei, are reacted with a bis-amino cycloalkene (2) to form the cyanine chromophore (3). Cyanine (3) is then derivatized by substituting the leaving group (LG) on the ring-locked portion of the cyanine chromophore with a phenyl ethylisothiocyanate compound (4) to form the cyanine dye (5). The nucleotide derivative "Z" is then coupled to the cyanine dye (5) by coupling the pendant alkynyl amine on nucleotide derivative (6) with the isothiocyanate portion of cyanine dye (5) to form the fluorescent reporter compound (7).

In a preferred, but not required, embodiment, modified cyanine dyes having an indole ring structure in the cyanine chromophore, according to the present invention are synthesized as shown below in Scheme 2. As shown in Scheme 2, first, a hydrazinobenzene (8) is reacted with a ketone, to form the indole ring (9). The amine in the indole ring is then coupled with an alkyl halide to form an iminium salt (10). Two equivalents of the iminium salt (10) are then reacted with a bis-amino chloro-cyclohexene compound (11) to produce the cyanine dye (12). Cyanine dye (12) is then further derivatized by substituting the chlorine on the ring-locked portion of the cyanine dye with the (hydroxyphenyl) ethylisothiocyanate compound (13) to form the cyanine dye (14).

Scheme 2. Synthesis of Indolyl Cyanine Dyes.

14

In another preferred, but not required, embodiment, modified cyanine dyes having a benzoindole ring structure in the cyanine chromophore, according to the present invention, are synthesized as shown below in Scheme 3. As shown in Scheme 3, first, benzoindole (15) is sulfonated to form the benzoindole (16). The benzoindole (16) is then coupled with an alkyl halide to form an iminium salt (17). Two equivalents of the iminium salt (17) are then reacted with the bis-amino chloro-cyclohexene compound (11) to produce the cyanine dye (18). Cyanine dye (18) is then further derivatized by substituting the chlorine on the ring-locked portion of the cyanine dye with the (hydroxyphenyl)ethyl-isothiocyanate compound (13) to form the cyanine dye (19).

Scheme 3. Synthesis of Benzoindole Cyanine Dyes.

-continued

19

In another embodiment, the present invention is a method of method of nucleic acid sequence analysis. In one embodiment, the method comprises reacting a fluorescent reporter labeled compound according to the present invention with a first nucleic acid sequence. This reaction produces a second nucleic acid sequence that is labeled with the fluorescent reporter labeled compound. Next, the reporter on the second nucleic acid sequence is detected.

In a preferred but not required embodiment, four fluorescent labeled reported compounds, i.e., dye terminators, corresponding to the four DNA bases, uracil (ddUTP), guanine (ddGTP), cytocine (ddCTP), and adenine (ddATP), collectively (ddNTPs), each dye terminator having a different modified cyanine dye according to the present invention are mixed in solution with the four natural (normal) DNA bases (dNTPs), DNA polymerase, a DNA template, and a sequencing primer. Next, the mixture is allowed to incubate, producing synthetic DNA strands until a ddNTP is incorporated into the synthetic DNA strand, thereby terminating the reaction sequence and producing multiple DNA fragments. Next, the DNA fragments are separated by size by methods known to those of skill in the art, such as electrophoresis on a sample plate or capillary gel electrophoresis. The separated fragments are then scanned and the fluorescent cyanine dyes are detected. Each of the four different cyanine dyes fluoresces at a wavelength that corresponds to the individual DNA base to which it is attached. The detected fluorescent wavelengths for each of the DNA fragment are then combined to determine the DNA sequence.

In a more preferred but not required embodiment, the DNA is sequenced by an automated system such as the Beckman CEQ™ 2000 DNA Analysis System, available from Beckman Coulter, having offices in Fullerton, Calif. A further description of this preferred system, methods, and reagents used therein can be found in *CEQ™ 2000 Dye Terminator Cycle Sequencing Chemistry Protocol, A Step by Step Guide to Dye Terminator Cycle Sequencing on the CEQ 2000*, 718119AB, Copyright 1999, Beckman Coulter, Inc.

The invention will be further described by reference to the following non-limiting examples, which are offered to further illustrate various embodiments of the present invention. It should be understood, however, that many variations and modifications can be made while remaining within the scope of the present invention.

EXAMPLES

Example 1

Preparation of 2,3,3-Trimethylindoleninium-5-sulfonate, Potassium Salt (9) Referring now to Scheme 2, a 500-mL round bottomed flask was equipped with a stir bar, reflux condenser, acetic acid (150 mL), p-hydrazinobenzenesulfonic acid (8, 50.0 g, 0.266 mol), and 3-methyl-2-butanone (84 mL, 0.785 mmol). The flask was then heated in an oil bath at 115° C. to reflux for 3 hours until all the starting material was consumed (determined by monitoring using TLC, 1:1 MeOH:$CH_2Cl_2$). The reaction flask was then cooled to room temperature. A pink solid was collected via filtration with the aid of ethylacetate. The pink solid was then dissolved in MeOH (800 mL) and passed through a pad of filter paper to remove some solid impurities. Potassium hydroxide (15 g) in isopropylalcohol (200 mL) was then added to the filtrate and the solution was stirred. A yellow solid precipitated which was collected, washed with methanol (2×50 mL), followed by washing with diethyl ether (2×50 mL), and then air dried. The yellow solid was further dried in an oven at 40° C. under high vacuum overnight, which provided 64.5 g (87.5%) of compound 9. TLC: $R_f$=0.875 (1:1 $CH_2Cl_2$:MeOH).

Example 2

Preparation of 1-Ethyl-2,3,3-trimethylindoleninium-5-sulfonate (10) Referring again to Scheme 2, a mixture of compound 9 (11 g, 0.04 mol) in ethyl iodide (40 mL) was heated to reflux under a nitrogen atmosphere. The reaction was monitored using TLC (4:1 $CH_2Cl_2$:MeOH) for the complete disappearance of starting material 9 ($R_f$=0.65) and the appearance of product 10 ($R_f$=0.25). After refluxing for 48 hours, TLC indicated the reaction was complete and the heating was stopped. The reaction mixture was cooled to room temperature and the reaction product was collected via filtration and washed with acetone (5×100 mL) and air dried. The solid product was then suspended in acetone (300 mL) and stirred overnight. The solid was filtered, washed with acetone (2×50 mL), and dried in an oven at 40° C. under high vacuum overnight to obtain the product 10 (11.8 g, quantitative yield). UV absorbance $\lambda_{max}$=289 nm.

Example 3

Preparation of Ring-locked Chloro-Cyanine Dye (12) Referring again to Scheme 2, compound 10 (1.0 g, 3.74 mmol), was added to a flame-dried 100-mL round bottom flask with compound 11 (671.9 mg, 1.87 mmol), sodium acetate (368.2 mg, 4.49 mmol) and ethanol (20 mL). The reaction solution was heated in an oil bath to reflux and stirred for 1 hour under a nitrogen atmosphere. An additional amount of compound 11 (500 mg) and sodium acetate (185 mg) were added to the reaction and further heated for 1 hour. Then, the reaction was diluted with methanol (50 mL) and filtered to remove the salt. The solvent was evaporated from the reaction under reduced pressure and the residual mixture was purified by column chromatography by eluting with a gradient solvent of methanol/methylene chloride. The product fractions were combined and concentrated to about 100 mL. The solution was then poured into ethyl ether (800 mL) and the resultant solid was collected and dried in an oven at 40° C. under high vacuum overnight to give 838.7 mg (67% yield) of a green solid 12 ($R_f$=0.23 (2:1 MeOH:CH$_2$Cl$_2$); Absorbance $\lambda_{max}$ (MeOH)=783 nm).

Example 4

Preparation of 2-(4-Hydroxyphenyl)ethylisothiocyanate (13) Referring again to Scheme 2, 1,1'-thiocarbonyldiimidazole (1.04 g, 5.8 mmol) was added to a solution of Tyramine (800 mg, 5.8 mmol) in DMF (20 mL). The reaction was stirred at room temperature for 30 min. The solvent was then evaporated under reduced pressure to produce an orange oil. The oil was dissolved in methanol (2 mL). Water (6 mL) was then added to the solution to precipitate the isothiocyanate 13. The product was collected via filtration and washed with cold water. After drying overnight in an oven under high vacuum at 40° C., 1.08 g (quantitative yield) of 13 was obtained.

Example 5

Preparation of Ring-locked Cy7 (14) Referring again to Scheme 2, 2-(hydroxyphenyl)ethylisothiocyanate (13, 214 mg, 1.2 mmol) was dissolved in anhydrous DMF (10 mL) in a flame-dried 100 mL flask under a nitrogen atmosphere at 0° C. Sodium hydride (95%, 28.6 mg, 1.2 mmol) was then added and the reaction was stirred at 0° C. for 10 minutes and then at ambient temperature for 30 minutes. The phenoxide solution was added to the chloro-cyanine dye 12 (200 mg, 0.30 mmol), dissolved in anhydrous DMF (10 mL), under a nitrogen atmosphere. The reaction was monitored using TLC for the disappearance of 12 and the appearance of product 14. After 18 hours, the reaction was quenched with methanol and the solvent was removed on a rotary evaporator at 40° C. The crude material was washed with ethyl acetate and purified by column chromatography to yield 150 mg (62%) of cyanine dye 14 (Absorbance $\lambda_{max}$ (MeOH)=770 nm). $^1$H NMR (CD$_3$OD, 300 MHz) δ 7.96 (d, 2H, J=14.1 Hz), 7.82 (d, 2H, J=8.3 Hz), 7.79 (s, 2H), 7.24 (m, 2H), 6.99 (m, 2H), 6.64 (d, J=8.5 Hz), 6.15 (d, 2H, J=14.3 Hz), 4.12 (m, 4H), 3.59 (t, 2H, J=5.8 Hz), 2.61–281 (m, 6H), 1.98 (t, 2H, J=5.2 Hz), 1.33 (s, 18 H).

Example 6

Potassium 1,1,2-Trimethylbenzoindolenine-7-sulfonate (16) Referring now to Scheme 3, 1,1,2-trimethyl-1H-benz(e)indole 15 (11.0 g, 52.6 mmol), was added to a dried 200-mL round-bottomed flask equipped with a stir bar. The flask was cooled in an ice water bath and sulfuric acid (10 mL) was then added to the reaction with stirring to partially dissolve the solid. Oleum (25 g, 30% SO$_3$, ~93.7 mmol) was then added and the reaction was stirred at 0° C. for 30 min. The reaction was then stirred at room temperature overnight, excluding moisture. After overnight reaction, the acid oil was poured into ice (200 mL) and stirred for 30 min. The acidic solution was then neutralized with potassium hydroxide until basic (pH>12). The solvent was evaporated under reduced pressure to a solid. The residual water was removed by triturating the solid with acetone followed by filtration. The dried solid was then extracted with hot methanol (~1 L). The undissolved salt was filtered and the filtrate was concentrated to a solid and triturated with EtOAc (300 mL). The solid was then collected, washed with ethylacetate (2×50 mL) and dried. Further drying in an oven at 45° C. under high vacuum overnight provided 17 g (quantitative) of the product 16. (TLC: $R_f$=0.28 (4:1 CH$_2$C$_2$:MeOH).

Example 7

Preparation of 1-Ethyl-2,3,3-trimethylbenzoindoleninium-7-sulfonate (17) Referring again to Scheme 3, a mixture of sulfonate 16 (6.50 g, 19.9 mmol) in ethyl iodide (25 mL) was heated to reflux under a nitrogen atmosphere. The reaction was monitored using TLC (2:1 CH$_2$Cl$_2$:MeOH) for the complete disappearance of starting material 16 ($R_f$=0.58) and the appearance of product 17 ($R_f$=0.22). After refluxing for 48 hours, TLC indicated the reaction was almost complete and the heating was stopped. The reaction mixture was cooled to room temperature and the reaction product was collected via filtration. The solid reaction product 17 was washed with acetone (3×100 mL) and air dried. The solid product 17 was then purified by column chromatography on silica gel (eluted with gradient solvent of MeOH:CH$_2$Cl$_2$). The product fractions were combined and concentrated. The solid was filtered, washed with acetone (2×50 mL) and then dried overnight in an oven at 40° C. under high vacuum to produce 1.34 g of the product 17 (30% yield).

Example 8

Preparation of Ring-locked Chloro- Cyanine Dye 18 Referring again to Scheme 3, compound 17 (200 mg, 0.63 mmol) was added-to a flame-dried 100-mL round bottom flask with compound 11 (113.2 mg, 0.315 mmol), sodium acetate (51.67 mg, 0.63 mmol) and ethanol (10 mL). The reaction solution was heated in an oil bath to reflux with stirring for 1 hour under a nitrogen atmosphere. An additional amount of compound 11 (100 mg) and sodium acetate (25 mg) was added to the reaction and heating was continued for 2 hours. The solvent was evaporated under reduced pressure and the residual mixture was dissolved in methanol (3 mL) and the product was precipitated with ethyl acetate (20 mL). The resultant solid product was collected via filtration and dried in an oven under high vacuum at 40° C. for 24 hours. A dark green solid of the chloro- cyanine dye 18 (298 mg, quantitative yield with some impurities) was obtained (TLC $R_f$=0.23 (2:1 MeOH:CH$_2$Cl$_2$); Absorbance $\lambda_{max}$ (MeOH)=816 nm). The solid was used in the subsequent synthetic step without further purification.

Example 9

Preparation of Ring-locked DBCy7 (19) Referring again to Scheme 3, 2-(hydroxyphenyl)ethylisothiocyanate (13, 279 mg, 1.6 mmol) was dissolved in anhydrous DMF (10 mL) in a flame-dried 100-mL flask under a nitrogen atmosphere at 0° C. Sodium hydride (95%, 37.4 mg, 1.6 mmol) was then added and the reaction was stirred at 0° C. for 10 min. The reaction was then stirred at ambient temperature for 30 min. The phenoxide solution was then added to the chloro-cyanine dye 18 (300 mg, 0.39 mmol), dissolved in anhydrous DMF (10 mL), under a nitrogen atmosphere. The reaction was monitored using TLC for the disappearance of 18 and the appearance of product 19. After 18 hours, the reaction was quenched with methanol and the solvent was removed on a rotary evaporator at 40° C. The crude material was washed with ethyl acetate and purified by column chromatography to afford 105 mg (29%) of compound 19 (Absorbance $\lambda_{max}$ (MeOH)=804 nm); $^1$H NMR (DMSO, 300 MHz) δ 8.25 (s, 2H), 8.11-8.15 (m, 4H), 7.95 (d, 2H, J=13.4 Hz), 7.80 (d, 2H, J=8.7 Hz), 7.71 (d, 2H, J=8.5 Hz), 7.31 (d, 2H, J=8.1 Hz), 7.12 (d, 2H, J=8.1 Hz), 6.21 (d, 2H, J=14.0 Hz), 4.15 (m, 4H), 3.59 (t, 2H, J =5.8 Hz), 2.60-2.80 (m, 6H), 1.98 (t, 2H, J=5.2 Hz), 1.58 (s, 12H), 1.33 (t, 6H, J=5.7 Hz).

Example 10

Preparation of ddCTP-RLCy7 (20)

20

According to the present invention, the fluorescent reporter compound 20, shown above, is prepared by coupling the cyanine dye 14 with the corresponding nucleic acid derivative. Referring now to Schemes 1 and 2, a solution of ring-locked ethylisothionate 14 (13.6 mg, 16.72 µmol) in isopropyl alcohol (270 µL), methanol (540 µL), and 0.1 M NaHCO$_3$/Na$_2$CO$_3$ pH 9.0 buffer (810 µL) in a dry scintillation vial was added ddCTP-propargylamine, Scheme 1, Compound 6, where Z=dideoxycytosine (4 µmol, 400 µL, 10 µmol/mL in water). The reaction was stirred at room temperature in the dark for 46 hours. During the reaction time period, small sample were withdrawn every 8 hours and checked using LIF-CE for reaction progress. The crude product was first partially purified by preparative TLC (500 µm, 20×20 cm, 1:1 CH$_2$Cl$_2$:MeOH). The product band was extracted with MeOH and filtered through a celite pad. The solvent was evaporated and the residue was dissolved in 10% methanol/water (1 mL). The product 20 was then purified with reverse-phase HPLC using a gradient solvent of 5 mM phosphate (solvent A) and methanol (solvent B).

The fractions were tested with CE and the pure fractions were combined, evaporated to dryness, redissolved in a minimum amount of water and applied on top of a Baker Bond Spe C18 column for desalting. The desalting method included a wash with water (3×5 mL) and the product was eluted with 50% methanol/water. The purity of the product was checked by CE and calculated to be 84.65 %. The solvent was concentrated and the product was redissolved in water (1 mL) and loaded on a DEAE Sephadex column (5 mL) which was equilibrated with 0.2 M TEAB buffer. The column was eluted with TEAB buffer with an increasing concentration: 100 mL (0.1 M); 100 mL (0.2 M); 100 mL (0.3 M); and 500 mL (0.5 M). The fractions were tested with LIF-CE and the pure fractions were pooled together and desalted as described above to obtain the fluorescent reporter compound 20 (4 mL, 84.7 µM, 94.7% purity).

Example 11

Preparation of ddATP-RLDBCy7 (21)

21

According to the present invention, the fluorescent reporter compound 21, shown above, is prepared by coupling the cyanine dye 19 with the corresponding nucleic acid derivative. Referring again to Schemes 1 and 3, to a solution of the ring-locked ethylisothionate compound 19 (50 mg, 0.054 mmol), dissolved in 13 mM pH 9 borate buffer (1.2 mL) and acetonitrile (0.8 mL), was added ddATP-propargylamine, Scheme 1, Compound 6, where Z=dideoxydeazaadenine (20 μmol, 1 mL, 20 μmol/mL in water). The solution was stirred in the dark for 24 hours at room temperature. During the period of reaction time small sample were withdrawn every 8 hours and checked using LIF-CE for the progress. The crude product was first partially purified using preparative TLC (500 μm, 20×20 cm, 1:1 CH$_2$Cl$_2$:MeOH). The product band was extracted with methanol and filtered through a celite pad. The solvent was evaporated and the residue was dissolved in 10% methanol/water (1 mL). The product was then purified with reverse-phase HPLC using a solvent gradient of 5 mM phosphate (solvent A) and methanol (solvent B).

The isolated fractions were tested with CE and the pure fractions were combined, evaporated to dryness, redissolved in minimum amount of water and applied on top of a Baker Bond Spe C18 column for desalting. The desalting method included a wash with water (3×5 mL) and eluting of the product with 50% methanol/water. The product was concentrated, redissolved in water (1 mL), and loaded on a DEAE Sephadex column (20 mL) which was equilibrated with 0.2 M TEAB buffer. The column was eluted with TEAB buffer with increasing concentration: 100 mL (0.2 M); 100 mL (0.4 M); 150 mL (0.45 M); 150 mL (0.6 M); 900 mL (0.75 M); and 700 mL (0.8 M). The fractions were tested with LIF-CE and the pure fractions were pooled together and desalted as described above to obtain the fluorescent reporter compound 21 (5 mL, 200 μM).

Example 12

Comparison spectra of cyanine dyes according to the present invention. Referring now to FIGS. 1A, 1B, 2A, and 2B, the normalized absorbance spectra of cyanine dyes 14 and 19, were compared to that of known cyanine dyes Cy7 and DBCy7, shown below, respectively.

Figure 1A:
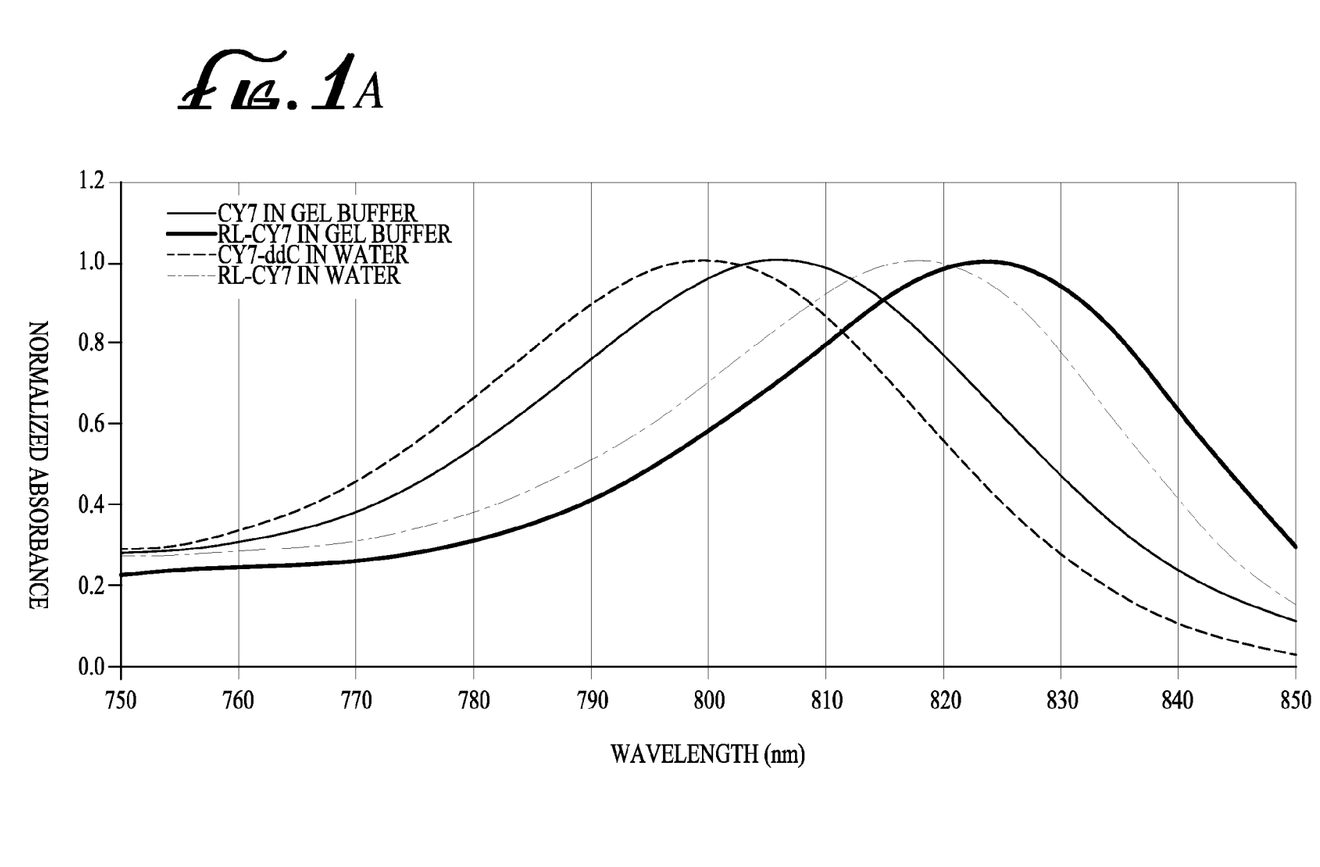
FIG. 1A is a graph comparing the normalized absorbance spectra of a modified cyanine dye according to the present invention and the cyanine dye Cy7.

Referring now to FIG. 1A, the normalized absorbance spectrum of cyanine dye 14, Ring-locked Cy7, was compared the normalized absorbance spectrum of known cyanine dye Cy7 in gel buffer and in water.

Figure 1B:
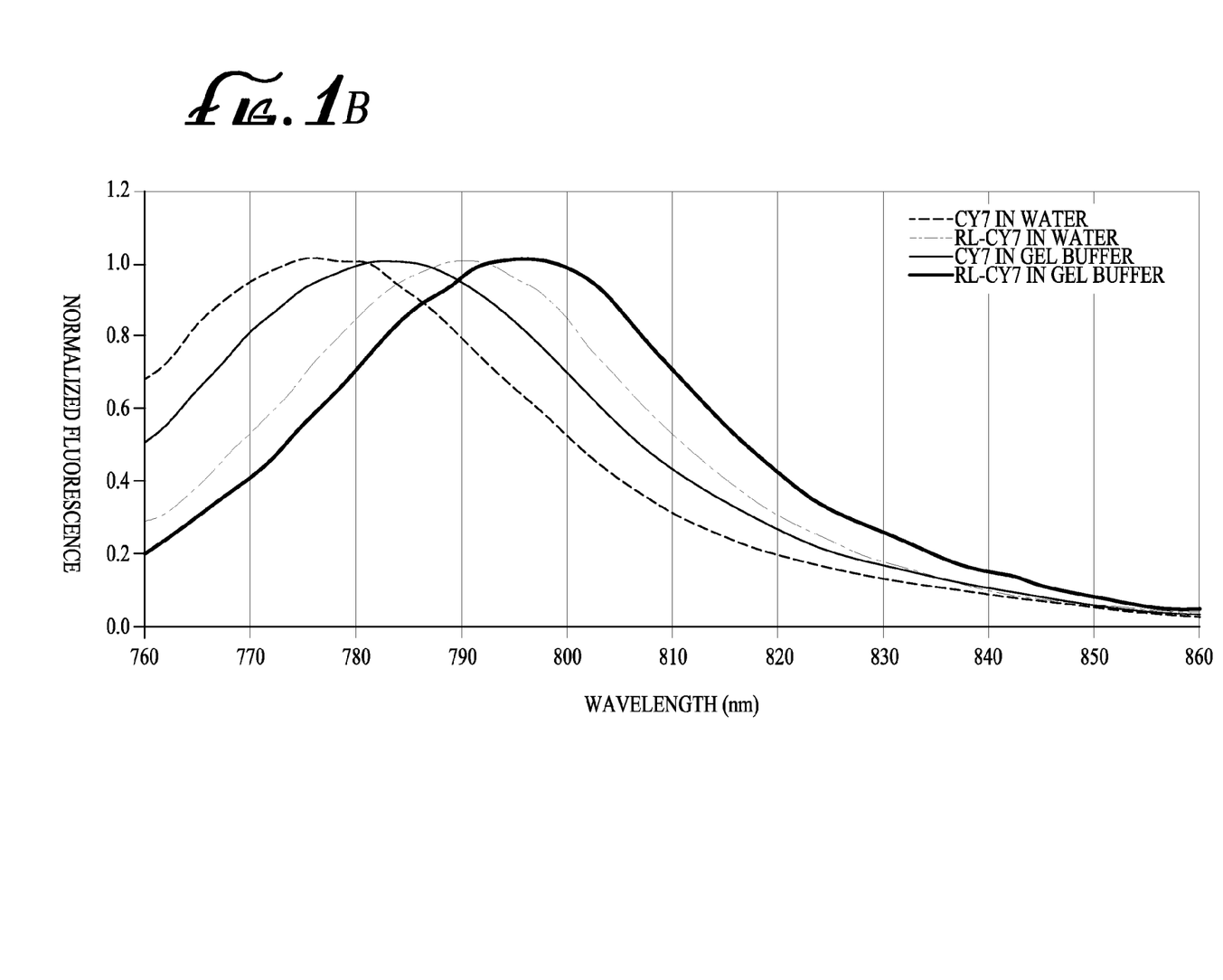
FIG. 1B is a graph comparing the normalized fluorescence spectra of a modified cyanine dye according to the present invention and the cyanine dye Cy7.

Referring now to FIG. 1B, the normalized fluorescence spectrum of cyanine dye 14, Ring-locked Cy7, was compared the normalized fluorescence spectrum of known cyanine dye Cy7 in gel buffer and in water.

Figure 2A:
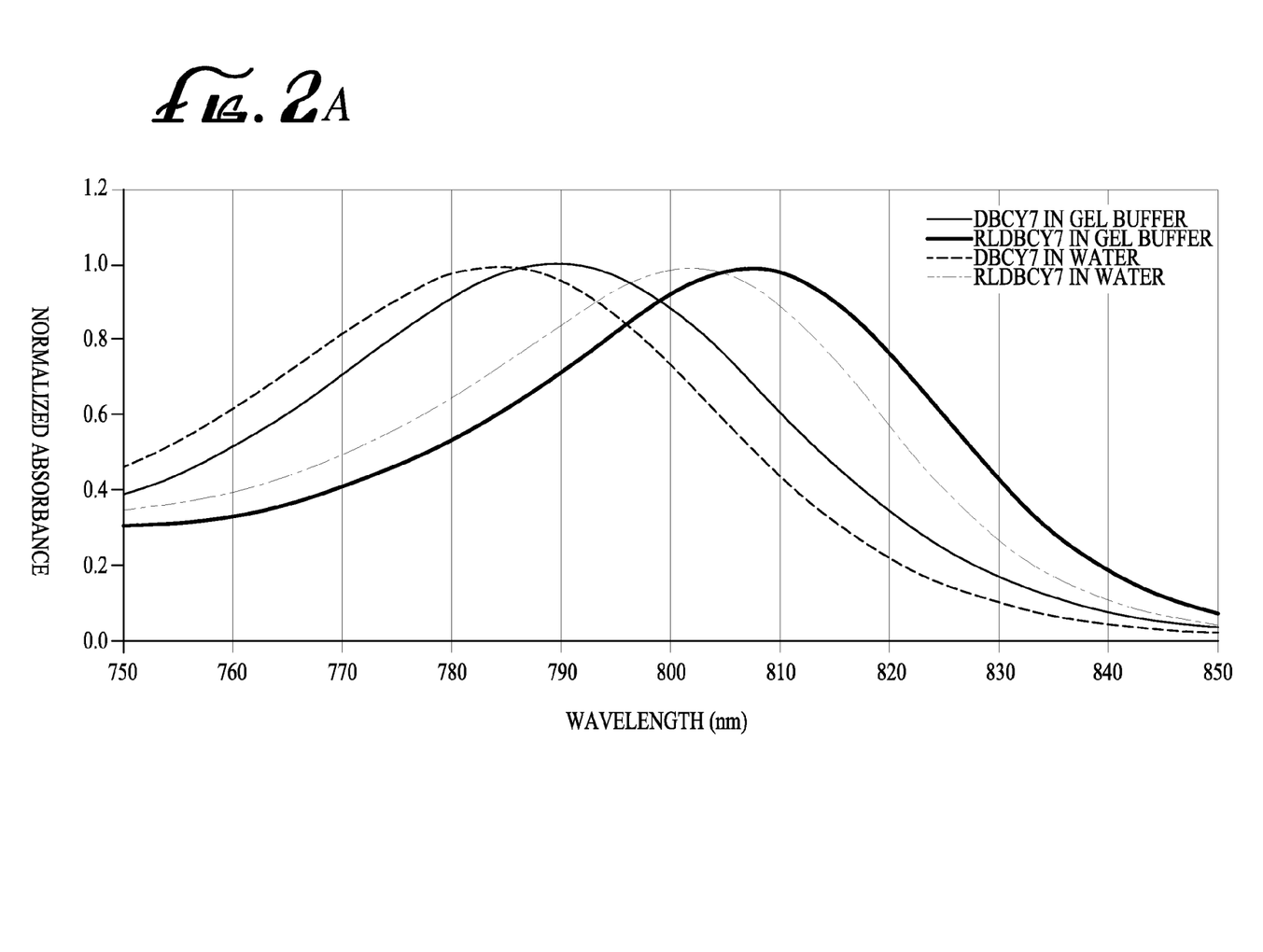
FIG. 2A is a graph comparing the normalized absorbance spectra of a modified cyanine dye according to the present invention and the cyanine dye DBCy7.

Referring now to FIG. 2A, the normalized absorbance spectrum of cyanine dye 19, Ring-locked DBCy7, was compared the normalized absorbance spectrum of known cyanine dye DBCy7 in gel buffer and in water.

Figure 2B:
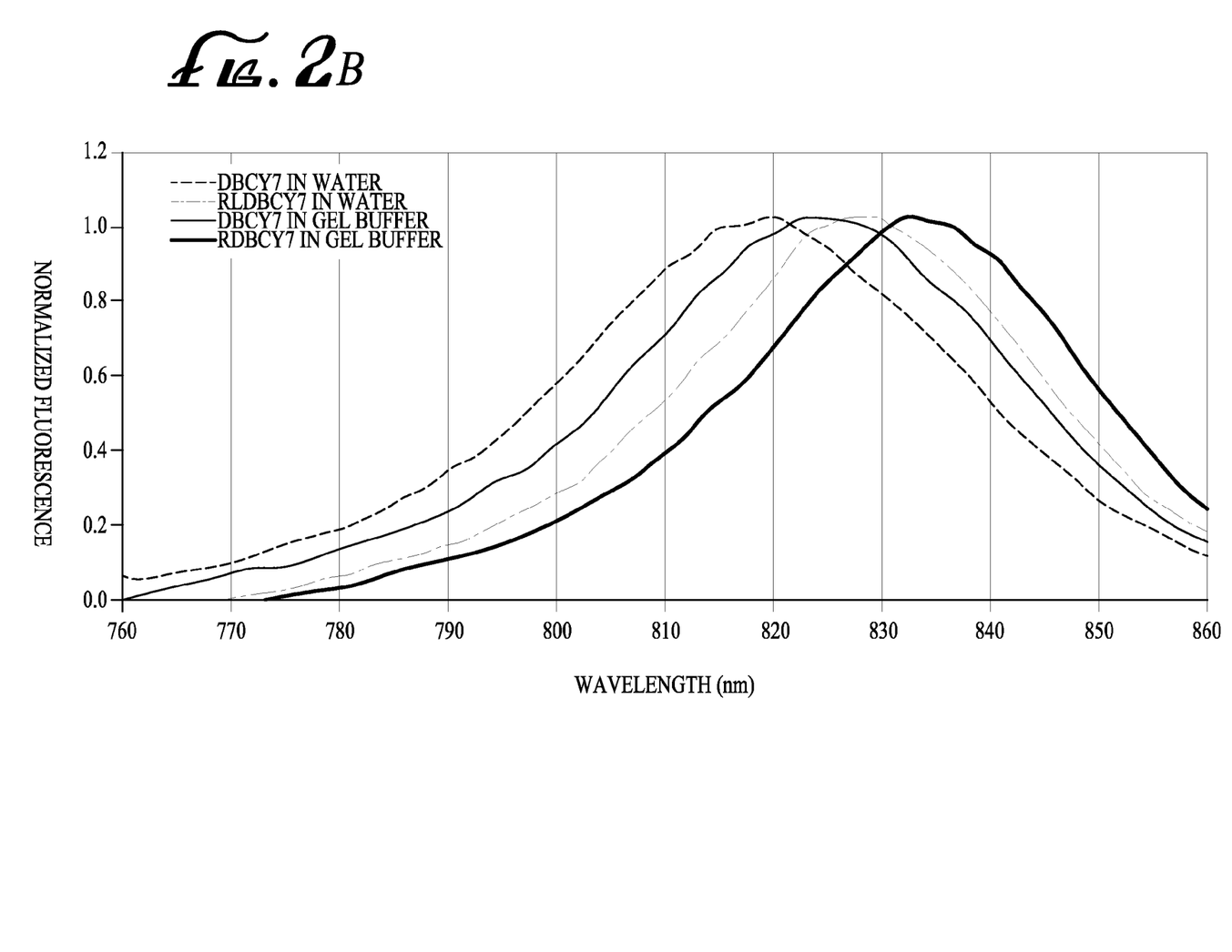
FIG. 2B is a graph comparing the normalized fluorescence spectra of a modified cyanine dye according to present invention and the cyanine dye DBCy7.

Referring now to FIG. 2B, the normalized fluorescence spectrum of cyanine dye 19, Ring-locked DBCy7, was compared the normalized fluorescence spectrum of known cyanine dye DBCy7 in gel buffer and in water.

The spectra shown in FIGS. 1-2 show the suitability of the compounds according to the present invention for absorbance and fluorescence based spectroscopy. The compounds have excitation and emission spectra in the near IR region and the emission spectra do not overlap such that the spectra can be individually detected.

Example 13

DNA Sequencing The two fluorescent reporter compounds 20 and 21, were substituted for two of the four dye terminators in the Beckman Coulter CEQ200 DNA analysis system. The current sequencing protocol described in *CEQ™ 2000 Dye Terminator Cycle Sequencing Chemistry Protocol, A Step by Step Guide to Dye Terminator Cycle Sequencing on the CEQ* 2000, 718119AB, Copyright 1999, Beckman Coulter, Inc., was followed, except compounds 20 and 21 replaced the ddCTP and ddATP reagents described therein. Using the fluorescent reporter compounds 20 and 21, sequence information for up to 600 bases, as tested using the CEQ2000 sequencing protocol, was obtained.

Although the present invention has been discussed in considerable detail with reference to certain preferred embodiments, other embodiments are possible. Therefore, the scope of the appended claims should not be limited to the description of preferred embodiments contained in this disclosure. All references cited herein are incorporated by reference in their entirety.

What is claimed is:

1. A fluorescent reporter compound of the formula:

wherein

Z is a nucleotide;

L is a linker of sufficient length to connect the nucleotide derivative to the cyanine dye, such that the cyanine dye does not significantly interfere with the overall binding and recognition of the nucleotide derivative by a nucleic acid replication enzyme; and Cy is a cyanine dye of the formula:

wherein

A and B are each independently the atoms necessary to form a cyanine nucleus;

$R_1$ and $R_2$ are each independently $C_1$-$C_6$ alkyl;

$R_3$ is hydrogen, or $C_1$-$C_4$ alkyl;

$R_4$ and $R_5$ are each independently selected from the group consisting of H and $SO_3^-$; and n is 2, 3, or 4.

2. A compound according to claim 1 wherein $R_4$ and $R_5$ are both $SO_3^-$.

3. A compound according to claim 1 wherein $R_1$ and $R_2$ are both $C_1$-$C_4$ alkyl.

4. A compound according to claim 1 wherein $R_1$ and $R_2$ are identical.

5. A compound according to claim 1 of the formula:

wherein

X is O, S, $NR_9$, or $CR_9R_{10}$;

$R_9$ and $R_{10}$ are each independently H or $C_1$-$C_4$ alkyl; and

Y is a diradical moiety having 3 to 20 atoms, at least three of which include an alkynyl group and one or more heteroatoms.

6. A compound according to claim 1 of the formula:

wherein:

C and D represent ring structures with sufficient carbon atoms to make up a benzene or naphthalene ring; and m is an integer from 1 to 6.

7. A compound according to claim 6 wherein $R_4$ and $R_5$ are both $SO_3^-$.

8. A compound according to claim 6 wherein $R_1$ and $R_2$ are both $C_1$-$C_4$ alkyl.

9. A compound according to claim 8 wherein $R_1$ and $R_2$ are identical.

10. A compound according to claim 1 of the formula:

11. A compound according to claim 1 of the formula:

12. A compound according to claim 1 having a fluorescence maximum greater than 750 nm as measured in an aqueous solution.

13. A fluorescent reporter compound of the formula:

$$\begin{array}{c} Z \\ | \\ L \\ | \\ Cy \end{array}$$

wherein
Z is a nucleotide derivative;
L is a linker having a chain length of at least 8 atoms; and
Cy is a cyanine dye of the formula:

wherein

A and B are each independently the atoms necessary to form a cyanine nucleus;

$R_1$ and $R_2$ are each independently $C_1$-$C_6$ alkyl;

$R_3$ is hydrogen, or $C_1$-$C_4$ alkyl;

$R_4$ and $R_5$ are each independently selected from the group consisting of H and $SO_3^-$; and n is 2, 3, or 4.

14. A compound according to claim 13 of the formula:

wherein:
C and D represent ring structures with sufficient carbon atoms to make up a benzene or naphthalene ring; and
m is an integer between and including 1-6.

15. A compound according to claim 13 having a fluorescence maximum greater than 750 nm as measured in an aqueous solution.

16. A method of nucleic acid sequence analysis comprising:
reacting a fluorescent reporter labeled compound according to claim 1 with a first nucleic acid sequence to produce a second nucleic acid sequence labeled with the fluorescent reporter-labeled compound; and
detecting the reporter on the second nucleic acid sequence.

17. A method for determining the base sequence of DNA comprising:
providing a mixture of fluorescent reporter labeled compounds according to claim 1 corresponding to each of the four DNA bases;
reacting a DNA template with a replication enzyme, a mixture of DNA nucleotides, and the mixture of fluorescent reporter-labeled compounds;
producing DNA fragments having a fluorescent reporter-labeled compound covalently attached to the 3'-terminal residue of each DNA fragment;
separating the fluorescent reporter-labeled DNA fragments; and
detecting the reporter for each separated fluorescent reporter-labeled DNA fragment thereby identifying the DNA sequence.

18. A compound of the formula:

wherein
A and B are each independently the atoms necessary to form a cyanine nucleus;
X is O, S, $NR_9$, or $CR_9R_{10}$;
$R_1$ and $R_2$ are each independently $C_1$-$C_6$ alkyl;
$R_3$ is hydrogen, or $C_1$-$C_4$ alkyl;
$R_4$ and $R_5$ are each independently selected from the group consisting of H and $SO_3^-$, provided that at least one of $R_4$ and $R_5$ is $SO_3^-$;
$R_9$ and $R_{10}$ are each independently H or $C_1$-$C_4$ alkyl;
p is an integer between and including 2-8; and
n is an integer between and including 2-4.

19. A compound according to claim 18 wherein $R_4$ and $R_5$ are both $SO_3^-$.

20. A compound according to claim 18 wherein $R_1$ and $R_2$ are both $C_1$-$C_4$ alkyl.

21. A compound according to claim 18 wherein $R_1$ and $R_2$ are identical.

22. A compound according to claim 18 of the formula:

23. A compound according to claim 18 of the formula:

* * * * *